United States Patent

[11] 3,634,197

[72] Inventor Sumio Umezawa
 Tokyo, Japan
[21] Appl. No. 679,528
[22] Filed Oct. 31, 1967
[45] Patented Jan. 11, 1972
[32] Priority Nov. 7, 1966
[33] Japan
[31] 41/72849

[54] PRODUCTION OF 3-AMINO-3-DEOXY-D-GLUCOSE
4 Claims, No Drawings

[52] U.S. Cl........................................................ 195/96
[51] Int. Cl....................................................... C12d 9/20

[50] Field of Search............................................ 195/96, 32,
42, 43, 29; 260/211.5

[56] References Cited
OTHER REFERENCES
Umezawa et al., The Journal of Antibiotics, Ser. A. Vol. 20 No. 6 pp. 355– 360 (1967).

*Primary Examiner*—Lionel M. Shapiro
*Attorneys*—Curtis W. Carlson, Richard H. Brink, Robert B. Simonton and Herbert W. Taylor, Jr.

ABSTRACT: Fermentation of the micro-organism *Bacillus amino-glucosidicus* nov. sp. produces 3-amino-3-deoxy-D-glucose which inhibits the growth of *Micrococcus pyrogenes* var. aureus and can be used in wash solutions for sanitation purposes.

3,634,197

PRODUCTION OF 3-AMINO-3-DEOXY-D-GLUCOSE

BACKGROUND OF THE INVENTION

1. Field of the Invention

This invention relates to a novel process for the preparation of 3-amino-3-deoxy-D-glucose. More particularly this invention relates to a novel process for the preparation of 3-amino-3-deoxy-D-glucose by fermentation of the micro-organism *Bacillus aminoglucosidicus* nov. sp.

2. Description of the Prior Art

The aminomonosaccharide, 3-amino-3-deoxy-D-glucose, is a known compound. The methyl glucoside derivative of 3-amino-3-deoxy-D-glucose was synthesized by S. Peat and L. F. Wiggins (J. Chem. Soc. London 1810 (1938) and several chemical syntheses of the amino-monosaccharide have recently been reported. However the occurrence of this amino-monosaccharide in nature was not revealed until it was found as a constituent of the antibiotic kanamycin by M. J. Cron et al. (J. Amer. Chem. Soc. 80, 2342, 4741 (1958). Generally, aminosugars very rarely occur in the monosaccharide form in nature.

SUMMARY OF THE INVENTION

There is provided according to the present invention a process which comprises cultivating a 3-amino-3-deoxy-D-glucose-producing strain of *Bacillus aminoglucosidicus* nov. sp. in an aqueous nutrient medium under aerobic conditions until substantial 3-amino-3-deoxy-D-glucose is produced.

DETAILED DESCRIPTION

This invention relates to a novel process for preparing 3-amino-3-deoxy-D-glucose by the cultivation of the micro-organism *Bacillus aminoglucosidicus* nov. sp.

The compound 3-amino-3-deoxy-D-glucose is known in the art. It is useful as an intermediate for the preparation of other antibiotics. The compound also inhibits the growth of *Micrococcus pyrogenes* var. aureus and is useful in wash solutions for sanitation purposes, as in the washing of hands and the disinfecting of various dental and medical equipment contaminated with *Micrococcus pyrogenes* var. aureus and as a bacteriostatic rinse for laundered clothes and for impregnating paper and fabrics. It can also be used as a feed supplement to promote the growth of animals, for example, mammals, birds, fish and reptiles.

The micro-organism used according to this invention for the production of 3-amino-3-deoxy-D-glucose has been designated as *Bacillus aminoglucosidicus* nov. sp. and is a new species of the genus Bacillus. It was isolated from a soil sample collected at the shore of Lake Haruna, Gunma Prefecture in Japan, and found to produce 3-amino-3-deoxy-D-glucose. A culture of the living organism given the laboratory designation A-4722 has been deposited in the American Type Culture Collection, Rockville, Maryland and added to its permanent collection of micro-organisms as A.T.C.C. No. 21143.

The microbiological characteristics of *Bacillus aminoglucosidicus* nov. sp. strain A-4722 are as follows:

When *Bacillus aminoglucosidicus* nov. sp. strain No. A-4722 was cultured on a usual agar plate, two kinds of round colonies were observed; one was bluish, almost transparent, little, smooth form (S-form, the surroundings of the colonies are smooth) and the other was opaque, somewhat thick, rough form of diameter about 1 mm. (R-form, the surrounding of colony is somewhat rough). However, studies of the two kinds of colonies have demonstrated that they have biologically and biochemically the same properties.

The organism is a Gram-positive bacillus with peritrichous flagella and the size of organism is 0.5–1.0×2.0–4.5 microns.

The organism exhibits the cultural characteristics as follows: (at 37° C., 24 hours)

| Medium | Remarks |
|---|---|
| Nutrient agar colonies: | Thin, smooth, translucent, small, glistening, round, quickly spreading. Variation: Relatively rough, large, creamy white. |
| Blood agar (horse): | Good growth, hemolysis (+). |
| Manitol salt agar: | No growth. |
| Potato: | Good growth, spreading, yellowish. |
| Nutrient bouillon: | Turbidity uniform, light to moderate. |
| Salmonella-Shigella agar: | No growth. |
| Deoxycholate-Hydrogen sulfide-Lactose agar: | No growth. |
| Indole is produced. | |

No gas from glucose.
Acetylmethylcarbinol is produced.
Urea is not decomposed.
Sodium citrate is utilized.
Milk is coagulated and peptonized.
Gelatin stab is liquefied.
Aerobic, facultatively anaerobic.
Temperature relations: Optimum about 30° C., maximum about 47° C. Growth after heating at 80° C. for 30 min., but no spore was observed under an electron microscope.

Utilization of carbohydrates is as follows:

| Compounds | Response | Compounds | Response |
|---|---|---|---|
| Arabinose | + | Trehalose | − |
| Xylose | + | Rhamnose | − |
| Glucose | + | Raffinose | − |
| Sucrose | + | Dextrin | − |
| Salicin | + | Inositol | − |
| Mannitol | + | Sorbitol | − |
| Maltose | − | Adonitol | − |
| Lactose | − | Dulcitol | − |

The above-mentioned characteristics suggested that the organism bears a close resemblance to *Bacillus alvei* as defined in Bergey's Manual of Determinative Bacteriology, 7th Ed., 1957. Characteristics which distinguish *Bacillus aminoglucosidicus* nov. sp. strain No. A-4722 from *Bacillus alvei* are: Utilization of sodium citrate and ability to produce 3-amino-3-deoxy-D-glucose.

The present invention is a process for the preparation of 3-amino-3-deoxy-D-glucose by the aerobic fermentation of *Bacillus aminoglucosidicus* or its natural or artificial mutants in an artificial or natural fermentation medium.

A medium well suited to produce high yields of 3-amino-3-deoxy-D-glucose has been found to contain a carbohydrate such as glucose, sucrose, and the like, a source of nitrogen such as soybean meal, peanut meal, cornsteep liquor, peptone, meat extract, and the like, and small quantities of inorganic salts such as sodium chloride, phosphate and of metallic ions and growth factors. At the start of fermentation the pH of the medium preferably is about 7, and the fermentation temperature preferably is within the range of about 25° to about 40° C. The fermentation may be carried out in a solid medium or in a suitable liquid medium in shallow layers. It is more desirable to use deep fermentation under aeration. It has been found that deep fermentations for from about 30 to about 40 hours produces a substantial amount of the aminosugar, 3-amino-3-deoxy-D-glucose.

Since it has been found that 3-amino-3-deoxy-D-glucose inhibits the growth of *Micrococcus pyrogenes* var. aureus 209p, the accumulation of the aminosugar in a fermentation medium can be estimated by the determination of the antibacterial activity of the medium. Alternatively, the determination of the strength of ninhydrincoloration of the spot corresponding to the aminosugar on a paperchromatogram is useful to estimate the maximal accumulation of the aminosugar in a medium.

The clear broth, which is obtained after removal of the bacterial cells by centrifugation or filtration, contains several ninhydrin-positive substances which are recognized by paperchromatography. The desired product is most conveniently separated from the mixture by adsorption procedures. Ion-exchange resins, active carbon or cellulose powder and the like are useful for the adsorption, however, the ion-exchange procedures are preferable. Among cation-exchange resins such as carboxylic-acid-type, sulfonic-acid-type and the like, the carboxylic-acid-type resin, for example Amberlite IRC-50, is most suitable. To elute 3-amino-3-deoxy-D-glucose from the absorbed resin, diluted aqueous ammonia is effective. The resulting crude substance can be purified through chromatography using cellulose powder or silica gel to give a crystalline powder. When the product is neutralized with hydrochloric acid in an aqueous solution and followed by concentration, crystals of the hydrochloride of 3-amino-3-deoxy-D-glucose are obtained.

CHARACTERISTICS OF 3-AMINO-3-DEOXY-D-GLUCOSE

Colorless crystalline powder; melting point is indistinct, decomposing gradually above 120° C.

| | |
|---|---|
| Elementary analyses: Found: | C, 40.07; H, 7.44; N, 7.53% |
| Calcd for $C_6H_{13}NO_5$: | C, 40.22; H, 7.31; N, 7.82% |
| Molecular weight: Found: 190. | Calcd for $C_6H_{13}NO_5$: 179 |
| Specific rotation: | $[\alpha]_D^{18}+39.2$ (c 0.91, water) (determined just after dissolution), $[\alpha]_D^{18}+19$ (c 0.91, water) determined at 24 hours after dissolution), showing mutarotation. |
| Color reactions: | Positive ninhydrin, Tollens, Fehling reactions. |
| Ultraviolet absorption spectrum: | no characteristic absorption in the range of 220–600 mµ. |
| Nuclear magnetic resonance spectrum: | τ Values in $D_2O$: 5.75–7.08 (H—COH); 7.15 (H—$CNH_2$); 6.20 ($H_2$—COH) |

Hydrochloride

Needles (very hygroscopic); recrystallized from isopropanal. M.p. 180° C. (difficulty determined because of extreme hygroscopicity).

| | |
|---|---|
| Elementary analyses: Found: | C, 33.90; H, 6.90; N, 6.65% |
| Calcd for $C_6H_{14}O_5NCl$: | C, 33.42; H, 6.54; N, 6.49% |

N-ACETYL DERIVATIVE

Needles, recrystallized from isopropanol. M.p. 198°–203° C. (decomp.)

| | |
|---|---|
| Elementary analyses: Found: | C, 43.51; H, 6.87; N, 6.32% |
| Calcd for $C_8H_{15}NO_6$: | C, 43.44; H, 6.84; N, 6.33% |
| Molecular Weight: Found: 210. | Calcd for $C_8H_{15}NO_6$: 221.2 |
| Specific rotation: | $[\alpha]_D^{26}+35$ (c 0.73, water) (determined at 15 hours after dissolution) |
| Infrared spectrum: | (Nujol): 3540, 3300 (OH); 1625, 1575 (NHCO). |

The above-mentioned data of the N-acetyl derivative coincide with the reported values (m.p. 199°–202° C. (decomp.) and $[\alpha]^{25}_D+43$ (c 1.0, water) by M. J. Cron et al. loc. cit.), and its mixed melting point with an authentic synthetic specimen showed no depression. Moreover, the N-acetyl derivative was identical in infrared spectrum with the authentic 3-acetamido-3-deoxy-D-glucose.

On the basis of the above-mentioned data, the aminosugar obtained from the broth of *Bacillus aminoglucosidicus* nov. sp. was determined to be 3-amino-3deoxy-D-glucose.

Among the known aminomonosaccharides, only D-glucosamine (namely 2-amino-2-deoxy-D-glucose) has so far been commercially producible. However, by the present invention, 3-amino-3-deoxy-D-glucose now can be produced commercially by the fermentation process.

The following examples will serve to illustrate the invention described herein without unduly restricting it.

EXAMPLE 1

*Bacillus aminoglucosidicus* nov. sp. strain A-4722 A.T.C.C. No. 21143 was cultured in ten 500 ml.-Erlenmeyer flasks each containing about 100 ml. of a medium consisting of glucose, (1.0 percent) soybean meal (1.5 percent) and sodium chloride (0.3 percent) on rotatory shakers at about 27°–35° C. Broths were harvested at about 90 hours. After removal of the bacterial cells by filtration, the clear broth was chromatographed on a column of Amberlite IRC-50 (300 ml., $NH_4^+$) (a carboxylic acid cation exchange resin) and, after washing with water, elution was carried out with 3 percent aqueous ammonia. Ninhydrinpositive and antibacterial fractions were collected and evaporated under reduced pressure to give crude 3-amino-3-deoxy-D-glucose in the form of a powder 1.5 g. (yield 103 percent). Thin-layer chromatography by ninhydrin coloration, using the solvent-system, butanol-pyridine-water-acetic acid (6:4:3:1) or the upper layer of 14 percent aqueous ammonia-methanol-chloroform (1:1:2), resulted in two spots; one (brown) was major and the other (purple) was minor; the major spot corresponded to 3-amino-3-deoxy-D-glucose. The major spot also exhibited antibacterial activity against *Micrococcus pyogenes* var. aureus 209p. The Rf value of the major spot coincided with that of the synthetic specimen of 3-amino-3-deoxy-D-glucose.

EXAMPLE 2

A sample (213 mg.) of crude 3-amino-3-deoxy-D-glucose (213 mg.) from example 1 was chromatographed on a column (3×40 cm.) of 50 g. of cellulose powder (100–200 mesh, Toyo filter paper) and eluted with the solvent-system butanol-pyridine-water-acetic acid (6:4:3:1). Fractions which exhibited antibacterial activity against *Micrococcus pyogenes* var. aureus 209p were collected and concentrated under reduced pressure.

The resulting residue was dissolved in distilled water (100 ml.) and the solution was again chromatographed on a column of Amberlite IRC-50 ($NH^+_4$ form, 300 ml.). After washing with water, elution was carried out with 3 percent aqueous ammonia. Concentration of the eluate under reduced pressure gave 3-amino-3-deoxy-D-glucose as a colorless crystalline powder, 128 mg. Thin-layer chromatography of the product showed a single spot, indicating the product was pure.

The product completely inhibited the growth of *Micrococcus pyogenes* var. aureus 209p at a dilution of 125 mcg./ml. by the tube-dilution method.

The physiocochemical properties of the product are described above under the heading "Characteristics of 3-amino-3-deoxy-D-glucose."

EXAMPLE 3

Inoculum of *Bacillus aminoglucosidicus* nov. sp. strain A-4722, A.T.C.C. No. 21143 was grown in a medium consisting of glucose (1.0 percent), soybean meal (1.5 percent) and sodium chloride (1.5 percent) in 500 ml.-Erlenmeyer flasks on a rotatory shaker for about 48 hours, in a similar way as described in the beginning of the example 1. The inoculum (300 ml.) was added to a sterilized fermentation medium consisting of glucose 100 g., soybean meal 150 g., sodium chloride 30g. and sterilized water 9.7 L. in a jar fermenter and fermentation was carried out for about 40 hours at about 30° C. under aeration (10 L./min.) and stirring (350 r.p.m.). Soybean oil was used as an antiforming agent. After removal of the bacterial cells by centrifuging, the broth was chromatographed on a column (7.5×45 cm.) of Amberlite IRC–50 ($NH^+_4$, 1.6 L.). After washing with water (3 L.), elution was carried out with 1 percent aqueous ammonia at a speed of 2 ml./min. Fractions between eluate 1,020 and 1,220 ml. contained the product. These fractions were collected and evaporated under reduced pressure to give 3-amino-3-deoxy-D-glucose as a crude powder, 9.6 g.

While in the foregoing specification various embodiments of this invention have been set forth in specific detail and elaborated for the purpose of illustration, it will be apparent to those skilled in the art that this invention is susceptible to other embodiments and that many of the details can be varied widely without departing from the basic concept and the spirit and scope of the invention.

I claim:

1. A process for the production of 3-amino-3-deoxy-D-glucose which comprises cultivating *Bacillus aminoglucosidicus* nov. sp. (A.T.C.C. No. 21143 in an aqueous nutrient medium under aerobic conditions until substantial 3-amino-3-deoxy-D-glucose is produced.

2. A process according to claim 1 and the additional step of recovering the 3-amino-3-deoxy-D-glucose so produced.

3. A process according to claim 1 which comprises cultivating *Bacillus aminoglucosidicus* nov. sp. A.T.C.C. No. 21143 in an aqueous nutrient medium containing a source of carbohydrate and nitrogen under aerobic conditions until substantial 3-amino-3-deoxy-D-glucose is produced and recovering the 3-amino-3-deoxy-D-glucose so produced.

4. A process according to claim 3 in which the cultivation is performed at a temperature of from about 25° to 40° C. and for at least about 30 hours.

* * * * *